(12) United States Patent
Lo et al.

(10) Patent No.: US 10,848,458 B2
(45) Date of Patent: Nov. 24, 2020

(54) SWITCHING DEVICE WITH MIGRATED CONNECTION TABLE

(71) Applicant: MELLANOX TECHNOLOGIES TLV LTD., Raanana (IL)

(72) Inventors: Alan Lo, Shoresh (IL); Matty Kadosh, Hadera (IL); Otniel Van Handel, Modiin Illit (IL); Yonatan Piasetzky, Tel Aviv (IL); Marian Pritsak, Lviv (UA); Omer Shabtai, Tel Aviv (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 165 days.

(21) Appl. No.: 16/194,343

(22) Filed: Nov. 18, 2018

(65) Prior Publication Data

US 2020/0162421 A1 May 21, 2020

(51) Int. Cl.
*H04L 29/12* (2006.01)
*H04L 29/08* (2006.01)

(52) U.S. Cl.
CPC ........ *H04L 61/255* (2013.01); *H04L 67/1008* (2013.01)

(58) Field of Classification Search
CPC ............... H04L 61/255; H04L 67/1008; H04L 2012/568; H04L 29/00; H04L 47/125; H04L 67/00
See application file for complete search history.

(56) References Cited

U.S. PATENT DOCUMENTS 8,014,278 B1 9/2011 Subramanian et al.
8,514,700 B2 8/2013 Hanes et al.
(Continued)

OTHER PUBLICATIONS

"SilkRoad: Making Stateful Layer-4 Load Balancing Fast and Cheap Using Switching ASICs", by Miao et al., SIGCOMM '17, Aug. 21-25, 2017, Los Angeles, CA, USA (Year: 2017).*
(Continued)

*Primary Examiner* — Tonia L Dollinger
*Assistant Examiner* — Jihad K Boustany
(74) *Attorney, Agent, or Firm* — Kligler & Associates Patent Attorneys Ltd

(57) ABSTRACT

A method including providing: a switching device including a main mapping unit configured to provide a main mapping which maps virtual addresses to direct addresses; management logic configured to store a connection tracking table stored in memory and configured for storing a plurality of connection mappings each including a virtual-to-direct mapping from a virtual address to a direct address; and a migrated connection table stored in memory and configured for storing a plurality of migrated connection mappings each including a virtual-to-migrated-direct mapping from a virtual address to a migrated direct address. Upon receiving an indication that a direct address has changed: when the indication that a direct address has changed includes an indication that a direct address stored in one or more connection mappings in the connection tracking table is not active, copying the one or more connection mappings from the connection tracking table to the migrated connection table, when the indication that a direct address has changed includes an indication that a new direct address has become active, creating one or more connection mappings in the migrated connection table, and altering the main mapping in accordance with the direct address change.

20 Claims, 12 Drawing Sheets

(56) References Cited

U.S. PATENT DOCUMENTS

| | | | |
|---|---|---|---|
| 9,331,929 | B1 | 5/2016 | Thomas et al. |
| 9,923,816 | B2 | 3/2018 | Kim et al. |
| 10,075,377 | B1 | 9/2018 | Sharma et al. |
| 10,091,112 | B1 | 10/2018 | Sharma et al. |
| 2005/0169172 | A1 | 8/2005 | Wang et al. |
| 2011/0161621 | A1* | 6/2011 | Sinclair ............... G06F 12/0246 711/207 |
| 2012/0275301 | A1 | 11/2012 | Xiong |
| 2014/0025923 | A1* | 1/2014 | Klein .................... G06F 3/0604 711/207 |
| 2014/0119193 | A1 | 5/2014 | Anand et al. |
| 2014/0133486 | A1 | 5/2014 | Sivasankar et al. |
| 2015/0271075 | A1* | 9/2015 | Zhang .................. H04L 47/125 370/235 |
| 2016/0065477 | A1 | 3/2016 | White |
| 2017/0214738 | A1 | 7/2017 | Agarwal et al. |
| 2018/0146030 | A1 | 5/2018 | Weng et al. |
| 2018/0176153 | A1 | 6/2018 | Reumann et al. |
| 2018/0234340 | A1 | 8/2018 | Kim et al. |
| 2019/0037033 | A1* | 1/2019 | Khakimov ............. H04L 67/16 |
| 2019/0058655 | A1 | 2/2019 | McDonald |

OTHER PUBLICATIONS

U.S. Appl. No. 15/959,234 office action dated May 1, 2019.

Thaler et al., "Multipath Issues in Unicast and Multicast Next-Hop Selection", Request for Comments: 2991, pp. 1-9, Nov. 2000.

IEEE Standard 802.1AX-2014 (Revision of IEEE Standard 802.1AX-2008)—IEEE Standard for Local and metropolitan area networks—Link Aggregation, pp. 1-344, Dec. 10, 2014.

Gafni et al., U.S. Appl. No. 15/959,234, filed Apr. 22, 2018.

Gandhi et al., "Duet: Cloud Scale Load Balancing with Hardware and Software", SIGCOMM'14, pp. 1-12, Chicago, USA, Aug. 17-22, 2014.

Miao et al., "SilkRoad: Making Stateful Layer-4 Load Balancing Fast and Cheap Using Switching ASICs", SIGCOMM 17, pp. 1-14, Los Angeles, USA, Aug. 21-25, 2017.

Wikipedia—Virtual IP address, pp. 1-2, Mar. 7, 2018 (Retrieved from "https://en.wikipedia.org/w/index.php?title=Virtual_IP_address &oldid=829269317").

Patel et al., "Ananta: Cloud Scale Load Balancing", SIGCOMM'13, pp. 207-218, Hong Kong, China, Aug. 12-16, 2013.

ISO/IEC 7498-1—International Standard—"Information technology—Open Systems Interconnection—Basic Reference Model: The Basic Model", pp. 1-68, Jun. 15, 1996.

Mellanox Indigo™ NPS-400™ Network Processor, Product Brief, pp. 1-3, year 2017.

Mellanox Spectrum™ Ethernet Switch IC, Product Brief, pp. 1-2, year 2017.

* cited by examiner

SWITCHING DEVICE WITH MIGRATED CONNECTION TABLE

FIELD OF THE INVENTION

The present invention relates to apparatus and methods for load balancing, and particularly, but not exclusively, to apparatus and methods for load balancing (particularly but not necessarily using switching hardware) in a virtual address environment.

BACKGROUND OF THE INVENTION

Various solutions have been proposed for providing large-scale load balancing, such as in the environment of cloud solutions. Existing methods focus, in the opinion of the inventors of the present invention, on scale, performance and robustness of the cloud solution, but do not consider issues with broken connections and affinity at the load balancer level. While some existing methods maintain flow state across the Multiplex (MUX) and a Direct IP (DIP) Host Agent for various functionalities, they do not, in the opinion of the inventors of the present invention, address client connectivity disruptions and connection retries due to changes in DIP assignment.

SUMMARY OF THE INVENTION

The present invention, in certain embodiments thereof, seeks to provide improved apparatus and methods for load balancing, and particularly, but not exclusively, to provide improved apparatus and methods for load balancing, (particularly but not exclusively using switching hardware) in a virtual address environment.

The present invention, in certain embodiments thereof, addresses the issue of load balancing when Direct IP (DIP, also known in the art as Real IP) address pools which are pointed to by client Virtual IP (VIP) addresses are updated. Such an issue may be more significant in an environment in which connection context for a client should be maintained. By way of one non-limiting example, in the Open Systems Interconnection (OSI) Basic Reference Model (specified by ISO/IEC International Standard 7498-1), seven layers of a layered architecture for computer interconnection are provided. Layer 4, the Transport Layer, provides inter alia functional and procedural mechanisms for transferring variable-length data sequences from a source to a destination host.

While the particular example of Layer 4 is used in various places in the present specification, it will be appreciated that the example of Layer 4 is non-limiting. In particular, and without limiting the generality of the foregoing, embodiments of the present invention may be suitable in cases where it is possible to detect, for a given protocol, at a per packet level, the start of a connection and the end of a connection based on information in the packet header. By way of particular example, and without limiting the generality of the foregoing, another suitable example may be SIP (which is at Layer 7) when implemented on top of UDP which is itself stateless and connectionless, but the semantics of connections can be understood from the SIP request methods.

The well-known TCP/IP (also known as Internet Protocol Suite) environment is one particular non-limiting example of an architecture for systems interconnection; although, formally speaking, TCP/IP does not follow the OSI Basic reference model, the TCP protocol within TCP/IP is generally considered a Layer 4 protocol. Other non-limiting examples may include, inter alia, SCTP, DCCP, and RUCP.

TCP is a connection-oriented protocol. In a case of DIP update, the client VIP connections may suffer significant degradation in performance due to the underlying change in DIP connectivity and the consequent broken connections, such as, by way of non-limiting example, broken TCP connections; persons skilled in the art will appreciate that, in the case of a broken TCP connection, significant overhead would be incurred in order to create a new TCP connection.

The present invention, in certain embodiments thereof, addresses the drawbacks referred to above by maintaining a connection tracking table in management logic, which may, in certain embodiments, include portions which are implemented in software (SW); in concert with a migrated connection table in a switching device, which may, in certain embodiments, include hardware (HW). In this way, as explained in more detail below, per-connection consistency (PCC) can be maintained across the load balancing functionality even subsequent to DIP updates. It will be appreciated that the aforementioned connection tracking table and migrated connection table (and other tables referenced herein) may in general be stored in memory or the equivalent in the management logic, switching device, or other host device.

In certain exemplary embodiments of the present invention, the management logic may comprise a general-purpose processor and appropriate memory, which processor is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

The management logic 100 may comprise, for example, a communication switch, a router, a server with switching capabilities, or an aggregation of network elements. The management logic 100 may comprise a network interface controller (NIC), which is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets to the network. In an exemplary embodiment, the NIC includes packet processing circuitry, comprising hardware logic, which comprises the main mapping unit and the management logic. Alternatively, the different elements of the management logic may be implemented using suitable hardware, such as in one or more Application-Specific Integrated Circuits (ASICs) or Field-Programmable Gate Arrays (FPGAs), using software, using hardware, or using a combination of hardware and software elements. In certain exemplary embodiments of the present invention, the switching device comprises a hardware switch.

It will be appreciated that, throughout the present application, the terms "software", "SW", "hardware" and "HW" are not meant to be limiting. Rather, in certain embodiments, "SW" represents a "slower" part of the system, with only a small part of total system traffic being routed to the SW due to the fact that it is a slower part of the system. "HW" represents a "faster" part of the system. The "HW" may, for example, comprise a suitable component which lends itself to hardware acceleration such as, for example: "pure" hardware; an Application Specific Integrated Circuit (ASIC); a multi-core Networking Processing Unit (NPU, one suitable non-limiting example of which may be the EzChip NPS-400, commercially available from Mellanox Technologies Ltd.); a Field Programmable Gate Array (FPGA); or a SW component, provided that the SW component is capable of handling packets at full packet input speed, also known in the art as "line rate".

There is thus provided in accordance with an exemplary embodiment of the present invention a method including providing a switching device including a main mapping unit configured to provide a main mapping which maps virtual addresses to direct addresses, providing management logic configured to store a connection tracking table stored in memory and configured for storing a plurality of connection mappings, each connection mapping in the connection tracking table including a virtual-to-direct mapping from a virtual address to a direct address, providing a migrated connection table stored in memory and configured for storing a plurality of migrated connection mappings, each migrated connection mapping including a virtual-to-migrated-direct mapping from a virtual address to a migrated direct address, upon receiving an indication that a direct address has changed: when the indication that a direct address has changed includes an indication that a direct address stored in one or more connection mappings in the connection tracking table is not active, copying the one or more connection mappings from the connection tracking table to the migrated connection table, when the indication that a direct address has changed includes an indication that a new direct address has become active, creating one or more connection mappings in the migrated connection table, and altering the main mapping in accordance with the direct address change.

Further in accordance with an exemplary embodiment of the present invention the method also includes, upon receiving an indication that a new connection is desired for a given virtual address, establishing a new connection mapping from the given virtual address to a new connection direct address, and storing the new connection mapping in the connection tracking table.

Still further in accordance with an exemplary embodiment of the present invention each direct address includes a non-virtual destination address.

Additionally in accordance with an exemplary embodiment of the present invention the indication that a direct address stored in one or more connection mappings in the connection tracking table is not active includes an indication of whether the one or more connections became not active due to a planned event or due to an unexpected event, and the copying the one or more connection mappings is conditionally performed based on the indication of whether the one or more connections became not active indicating that the one or more connections became not active due to a planned event.

Moreover in accordance with an exemplary embodiment of the present invention the main mapping unit is configured to carry out a hash function and a modulo function.

Further in accordance with an exemplary embodiment of the present invention the method also includes receiving a message directed to a desired connection, the message including a received virtual address, attempting to find a mapping for the desired connection in the migrated connection table, when a mapping from the received virtual address is found in the migrated connection table, sending the message onward in accordance with a migrated direct address found in the mapping in the migrated connection table, and when a mapping from the received virtual address is not found in the migrated connection table, sending the message onward in accordance with the main mapping.

This is also provided in accordance with another exemplary embodiment of the present invention apparatus including a switching device including a main mapping unit configured to provide a mapping which maps virtual addresses to direct addresses, management logic comprising memory and configured to store a connection tracking table configured for storing a plurality of connection mappings, each connection mapping including a virtual-to-direct mapping from a virtual address to a direct address, a migrated connection table comprising memory and configured for storing a plurality of migrated connection mappings, each migrated connection mapping including a virtual-to-migrated-direct mapping from a virtual address to a migrated direct address, the apparatus being configured, upon receiving an indication that a direct address has changed to perform the following: when the indication that a direct address has changed includes an indication that a direct address stored in one or more connection mappings in the connection tracking table is not active, copy the one or more connection mappings from the connection tracking table to the migrated connection table, when the indication that a direct address has changed includes an indication that a new direct address has become active, create one or more connection mappings in the migrated connection table, and alter the main mapping in accordance with the direct address change.

Further in accordance with an exemplary embodiment of the present invention the apparatus is also configured, upon receiving an indication that a new connection is desired for a given virtual address, to perform the following: establish a new connection mapping from the given virtual address to a new connection direct address, and store the new connection mapping in the connection tracking table.

Still further in accordance with an exemplary embodiment of the present invention each direct address includes a non-virtual destination address.

Additionally in accordance with an exemplary embodiment of the present invention the indication that a direct address stored in one or more connection mappings in the connection tracking table is not active includes an indication of whether the one or more connections became not active due to a planned event or due to an unexpected event, and the apparatus is configured to copy the one or more connection mappings conditionally based on the indication of whether the one or more connections became not active indicating that the one or more connections became not active due to a planned event.

Moreover in accordance with an exemplary embodiment of the present invention the main mapping unit is configured to carry out a hash function and a modulo function.

Further in accordance with an exemplary embodiment of the present invention the apparatus is further configured to receive a message directed to a desired connection, the message including a received virtual address, to attempt to find a mapping for the desired connection in the migrated connection table, when a mapping from the received virtual address is found in the migrated connection table, to send the message onward in accordance with a migrated direct address found in the mapping in the migrated connection table, and when a mapping from the received virtual address is not found in the migrated connection table, to send the message onward in accordance with the main mapping.

There is also provided in accordance with another exemplary embodiment of the present invention a method including providing a switching device including a main mapping unit configured to provide a main mapping which maps virtual addresses to direct addresses, providing management logic configured to store a connection tracking table stored in memory and configured for storing a plurality of connection mappings, each connection mapping including a virtual-to-direct mapping from a virtual address to a direct address, providing a migrated connection table stored in memory and configured for storing a plurality of migrated connection mappings, each migrated connection mapping including a virtual-to-migrated-direct mapping from a virtual address to a migrated direct address, receiving a message directed to a desired connection, the message including a received virtual address, attempting to find a mapping for the desired connection in the migrated connection table, when a mapping from the received virtual address is found in the migrated connection table, sending the message onward in accordance with a migrated direct address found in the mapping in the migrated connection table, and when a mapping from the received virtual address is not found in the migrated connection table, sending the message onward in accordance with the main mapping.

Further in accordance with an exemplary embodiment of the present invention each direct address includes a non-virtual destination address.

Still further in accordance with an exemplary embodiment of the present invention the main mapping unit is configured to carry out a hash function and a modulo function.

There is also provided in accordance with another exemplary embodiment of the present invention apparatus including a switching device including a main mapping unit configured to provide a main mapping which maps virtual addresses to direct addresses, management logic configured to store in memory a connection tracking table configured for storing a plurality of connection mappings, each connection mapping including a virtual-to-direct mapping from a virtual address to a direct address, a migrated connection table configured for storing in memory a plurality of migrated connection mappings, each migrated connection mapping including a virtual-to-migrated-direct mapping from a virtual address to a migrated direct address, the apparatus being configured, upon receiving a message directed to a desired connection, the message including a received virtual address, to perform the following: attempt to find a mapping for the desired connection in the migrated connection table, when a mapping from the received virtual address is found in the migrated connection table, send the message onward in accordance with a migrated direct address found in the mapping in the migrated connection table, and when a mapping from the received virtual address is not found in the migrated connection table, send the message onward in accordance with the main mapping.

Further in accordance with an exemplary embodiment of the present invention each direct address includes a non-virtual destination address.

Still further in accordance with an exemplary embodiment of the present invention the main mapping unit is configured to carry out a hash function and a modulo function.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
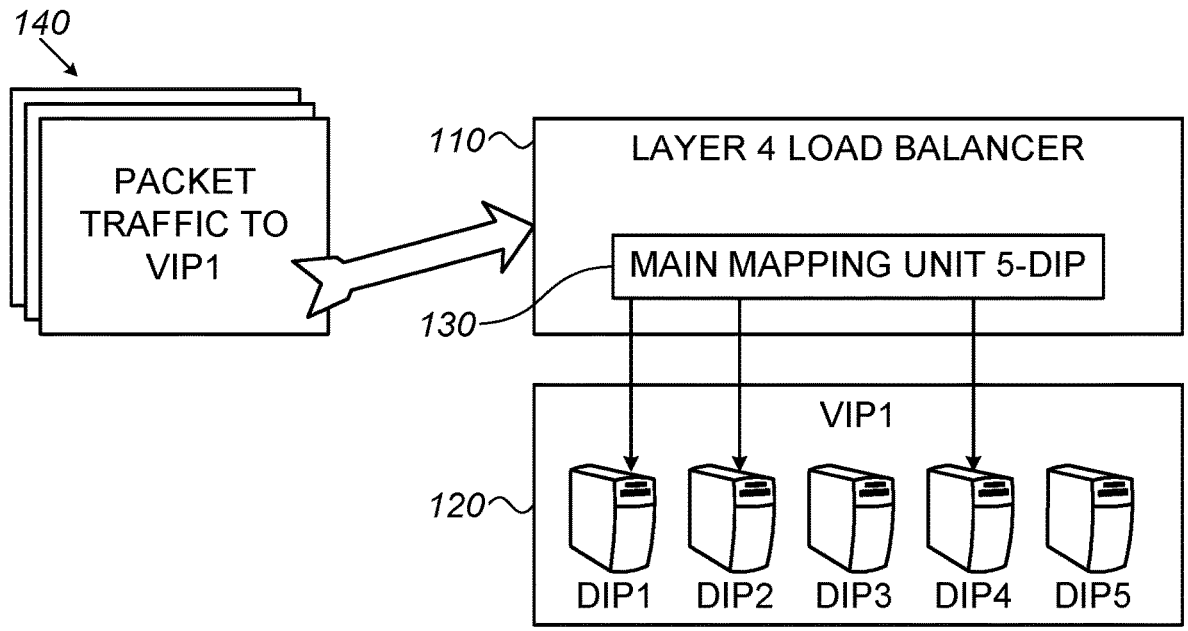
FIG. 1 is a simplified pictorial illustration of an exemplary load balancing system constructed and operative in accordance with an exemplary embodiment of the present invention.

Reference is now made to FIG. 1, which is a simplified pictorial illustration of an exemplary load balancing system constructed and operative in accordance with an exemplary embodiment of the present invention.

The system of FIG. 1 comprises a load balancer 110; without limiting the generality of embodiments of the present invention, the load balancer 110 is depicted in FIG. 1 and may be described herein as a layer 4 load balancer (layer 4 herein referring generally to layer 4 of the ISO/IEC OSI Basic Reference Model described above, and to protocols which operate in a way similar to layer 4, such as the TCP protocol described above). It is appreciated that while the structure and functionality of the load balancer 110 may be particularly suitable for layer 4 load balancing, the load balancer 110 is not necessarily restricted to load balancing at layer 4.

The system of FIG. 1 also comprises a pool of servers 120, depicted in FIG. 1 as a pool comprising five servers denoted DIP1 through DIP5. Persons skilled in the art will appreciate that a pool of servers may comprise a large plurality or multiplicity of servers, such as hundreds or thousands of servers; without limiting the generality of the foregoing, five servers are depicted in FIG. 1 for simplicity of depiction and description.

The pool of servers 120 of FIG. 1 is associated with a virtual IP (VIP) address, depicted in FIG. 1 as VIP1. While only a single pool of servers 120 with a single VIP address is depicted in FIG. 1, persons skilled in the art will appreciate that the system of FIG. 1 may comprise a plurality of pools of servers, each pool generally having its own VIP address; without limiting the generality of the foregoing, only a single pool of servers 120 is depicted in FIG. 1 for simplicity of depiction and description.

The load balancer 110 of FIG. 1 comprises a main mapping unit 130. (Since the main mapping unit 130 is comprised in the load balancer 110, it will be appreciated that the main mapping unit 130 comprise a switching device such as, by way of non-limiting example, a hardware-implemented switch. One particular non-limiting example of a suitable switch is the Mellanox Spectrum Ethernet switch, commercially available from Mellanox Technologies Ltd. It is appreciated that such switching devices comprise, inter alia, suitable processors and memory.) The main mapping unit 130 is operative to balance traffic between the various servers in the pool of servers 120; since five servers are depicted in the pool of servers 120, the main mapping unit 130 is also termed herein a "main mapping unit 5-DIP", denoting a main mapping unit that handles mapping to 5 DIP servers (as discussed in more detail below), in FIG. 1. Without limiting the generality of the foregoing, persons skilled in the art will appreciate that, as part of a mapping function provided by the main mapping unit 5-DIP 130, the main mapping unit 5-DIP 130 may, in certain particular embodiments, perform a modulo 5 operation on an intermediate result in order to obtain a final result indicating to which of the five servers in the pool of servers 120 a given traffic packet is to be directed. The example of using a modulo operation is not meant to be limiting.

Persons skilled in the art will appreciate that, in order to operate the system of FIG. 1 efficiently, the load balancer 110 may comprise a switching device such as, by way of non-limiting example, a hardware-implemented switch. One particular non-limiting example of a suitable switch is the Mellanox Spectrum Ethernet switch, commercially available from Mellanox Technologies Ltd.

A non-limiting example of the operation of the system of FIG. 1 is now briefly described. Packet traffic 140, comprising in the example of FIG. 1 a plurality of packets directed to VIP1, is directed to the load balancer 110. The load balancer 110, using the main mapping unit 130, distributes the packet traffic 140 evenly, or substantially evenly, or approximately evenly, or according to any suitable weighting function, between the plurality of servers (DIP1 through DIP5) comprised in the pool of servers 120. As explained above, in so far as the packet traffic 140 comprises layer 4 traffic, in order to provide consistency and efficiency it is preferred that all packets comprised in the packet traffic 140 which are part of a given connection will be sent to a given server of the plurality of servers; apparatus and methods for accomplishing this are described below.

Figure 2:
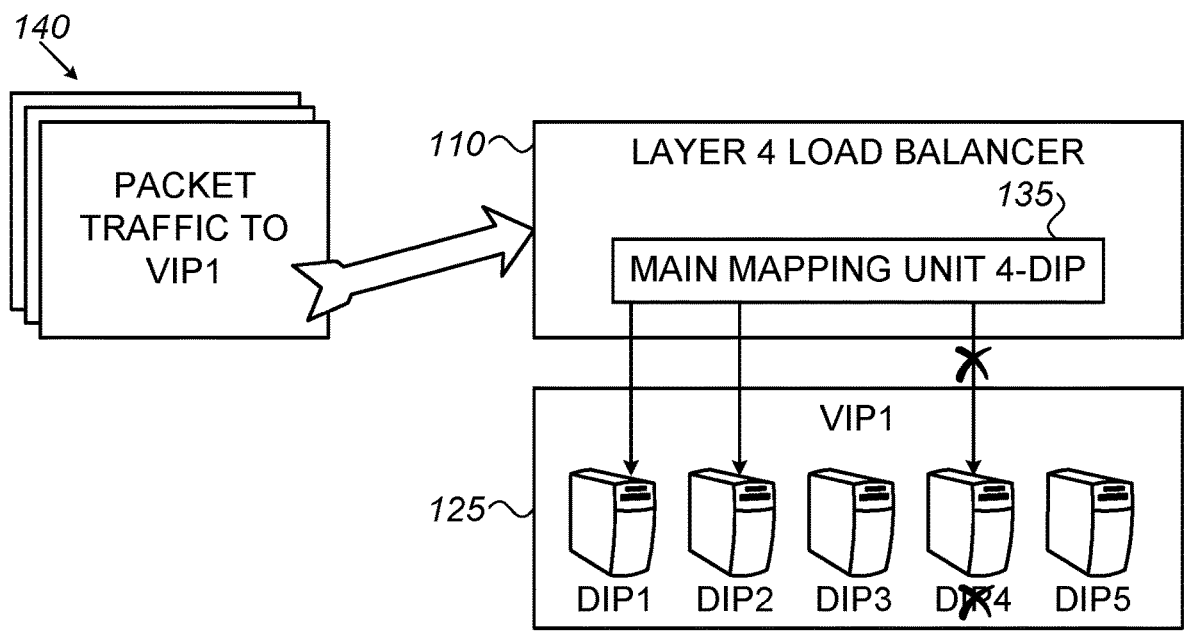
FIG. 2 is a simplified pictorial illustration of the load balancing system of FIG. 1, depicting a situation in which a direct IP (DIP) unit is taken off line.

Reference is now made to FIG. 2, which is a simplified pictorial illustration of the load balancing system of FIG. 1, depicting a situation in which a direct IP (DIP) unit is taken off line. Without limiting the generality of the foregoing, in the system of FIG. 2 one of the servers, namely the server denoted DIP4, is depicted as having been taken off line.

Once the server denoted DIP4 has been taken off line, there are now, in the particular example of FIG. 2, four servers comprising servers denoted DIP1, DIP2, DIP3, and DIP5. In order to emphasize the reduction in the number of available servers, a reduced pool of servers 125 is depicted in FIG. 2 instead of the pool of servers 120 of FIG. 1, with servers denoted DIP1, DIP2, DIP3, and DIP5 being comprised in the reduced pool of servers 125.

Consequently to the number of servers in the reduced pool of servers 125 being smaller than the number of servers in the pool of servers 120 of FIG. 1, the load balancer 110 in FIG. 2 is depicted as comprising a reduced main mapping unit 135, in place of the main mapping unit 130 of FIG. 1. Since four servers are depicted in the reduced pool of servers 125, the main mapping unit 135 is also termed herein a "main mapping unit 4-DIP", denoting a main mapping unit that handles mapping to 4 DIP servers. Without limiting the generality of the foregoing, persons skilled in the art will appreciate that, as part of a mapping function provided by the reduced main mapping unit 135, the reduced main mapping unit 135 may, in certain particular embodiments, perform a modulo 4 operation on an intermediate result in order to obtain a final result indicating to which of the four servers in the reduced pool of servers 120 a given traffic packet is to be directed. The example of using a modulo operation is not meant to be limiting.

As explained above, including with reference to FIG. 1, in so far as the packet traffic 140 comprises layer 4 traffic, in order to provide consistency and efficiency it is preferred that all packets comprised in the packet traffic 140 which are part of a given connection will be sent to a given server of the plurality of servers. Persons skilled in the art will appreciate that, in the description of FIG. 2, if the response of the system of FIG. 2 to a server having been taken off line comprises only a modification of the main mapping unit 130 to produce the reduced main mapping unit 135, many connections will be disconnected and will need to be reestablished, since, for example, (considering for the sake of simplicity of description the particular example in which a modulo operation is performed) replacing the use of modulo 5 with the use of modulo 4, without further change, will inevitably cause many packets in a given connection to be sent to a different server than the server to which previous packets in that connection were sent. Apparatus and methods for providing an improved response to taking a server off line, or to adding a server, are described with reference to the following drawings.

Figure 3:
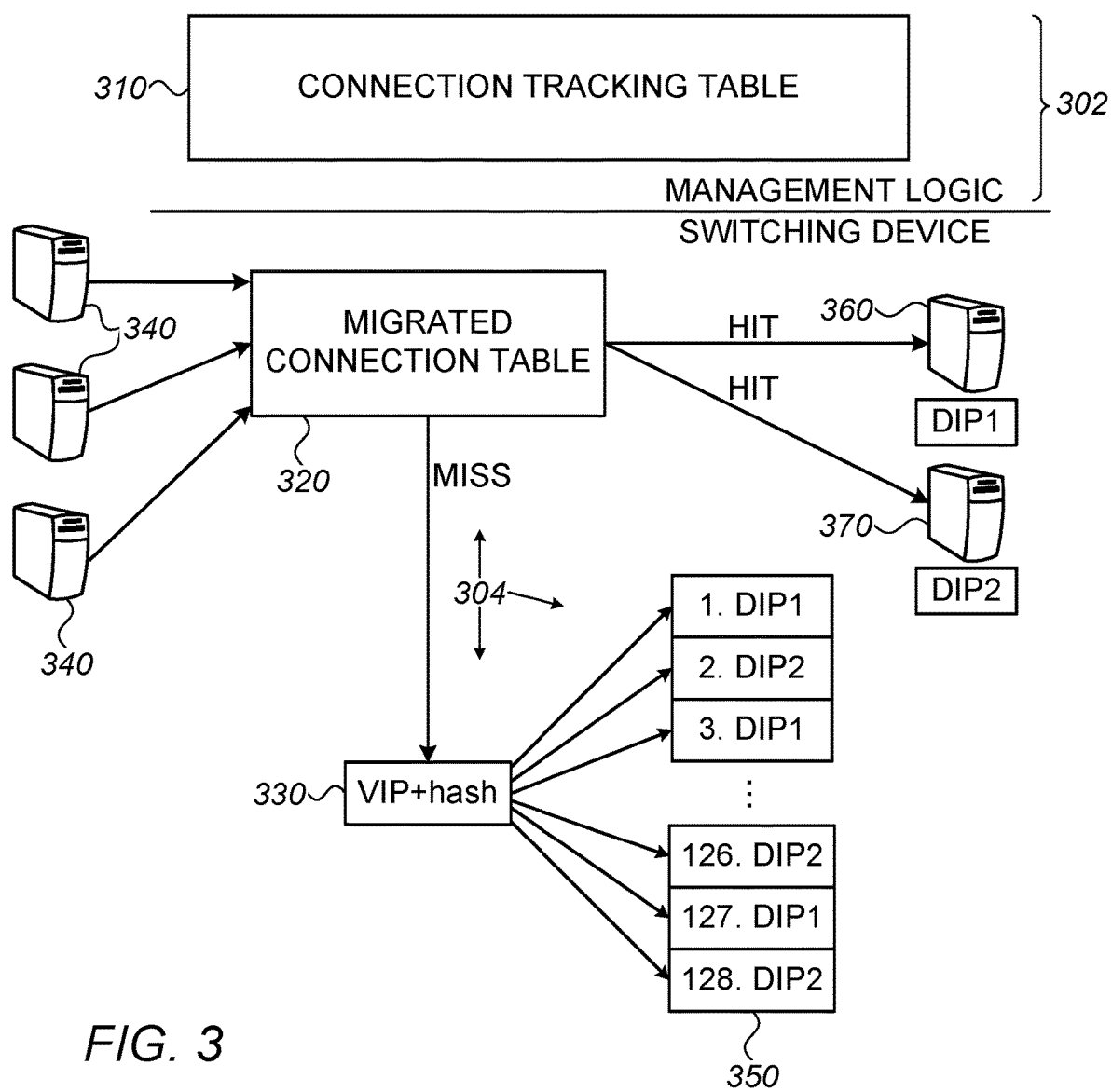
FIG. 3 is a simplified pictorial illustration of a portion of the load balancing system of FIGS. 1 and 2, including a connection tracking table and a migrated connection table.

Reference is now made to FIG. 3, which is a simplified pictorial illustration of a portion of the load balancing system of FIGS. 1 and 2, including a connection tracking table 310 and a migrated connection table 320. For the sake of simplicity of depiction and description, in FIGS. 3-11 and in the description thereof, connections are shown and described as TCP connections; as described above, persons skilled in the art will appreciate that other stateful connections could alternatively be used. The state of the system of FIGS. 1 and 2, depicted FIG. 3, is an "initial state", that is, a state in which there are presently no connections.

The system of FIG. 3 comprises the following elements that may be implemented within the load balancer 110 of FIGS. 1 and 2:

a connection tracking table 310;
a migrated connection table 320; and
a VIP+hash mapping unit 330.

The system of FIG. 3 also comprises one or more clients 340; a lookup table 350; and one or more DIPs, shown as a DIP1 360 and a DIP2 370.

In order to achieve good scale, the connection tracking table 310 is, in certain embodiments of the present invention, implemented in management logic 302, as described above. In order to achieve good performance, the migrated connection table 320 and the VIP+hash mapping unit 330 are, in certain embodiments of the present invention (by way of non-limiting example), implemented in a switching device 304, as described above.

In certain particular embodiments, the management logic 302 and the switching device 304 may be disposed on a single chip or a System-on-chip (SoC). Alternatively, the management logic 302 may be deployed, for example, on a virtual machine (VM) with a data-plane driver to direct packets thereto; such an implementation might provide greater scalability.

As depicted in FIG. 3, when packet traffic 140 (FIGS. 1 and 2) to VIP1 arrives from one or more clients 340, a lookup takes place, for each packet, in the migrated connection table 320. The lookup process is also termed herein "attempting to find a mapping in the migrated connection table". In case of a miss, indicating that no entry for a connection associated with a given packet is found in the migrated connection table 320, processing takes places at the VIP+hash mapping unit 330, in which appropriate bits of the incoming packet for a given VIP are hashed and the result is then used for lookup in a lookup table 350, in order to determine to which DIP of a plurality of DIPs a given packet should be sent.

For simplicity of depiction, the lookup table 350 is depicted in FIG. 3 as having 128 slots numbered 1 through 128; persons skilled in the art will appreciate that a substantially larger lookup table 350 may be used, and that the numbering from 1 through n (128 in the case of the lookup table 350 of FIG. 3) is arbitrary, with any appropriate numbering being usable.

If, for example, the lookup is directed to slot 2 of the lookup table 350 of FIG. 3, then the corresponding packet is directed to DIP2 370, since slot 2 of the lookup table 350 indicates DIP2.

Reference is now made to FIGS. 4-11, which are simplified pictorial illustrations of the system of FIG. 3, showing various exemplary states of operation thereof.

Figure 4:
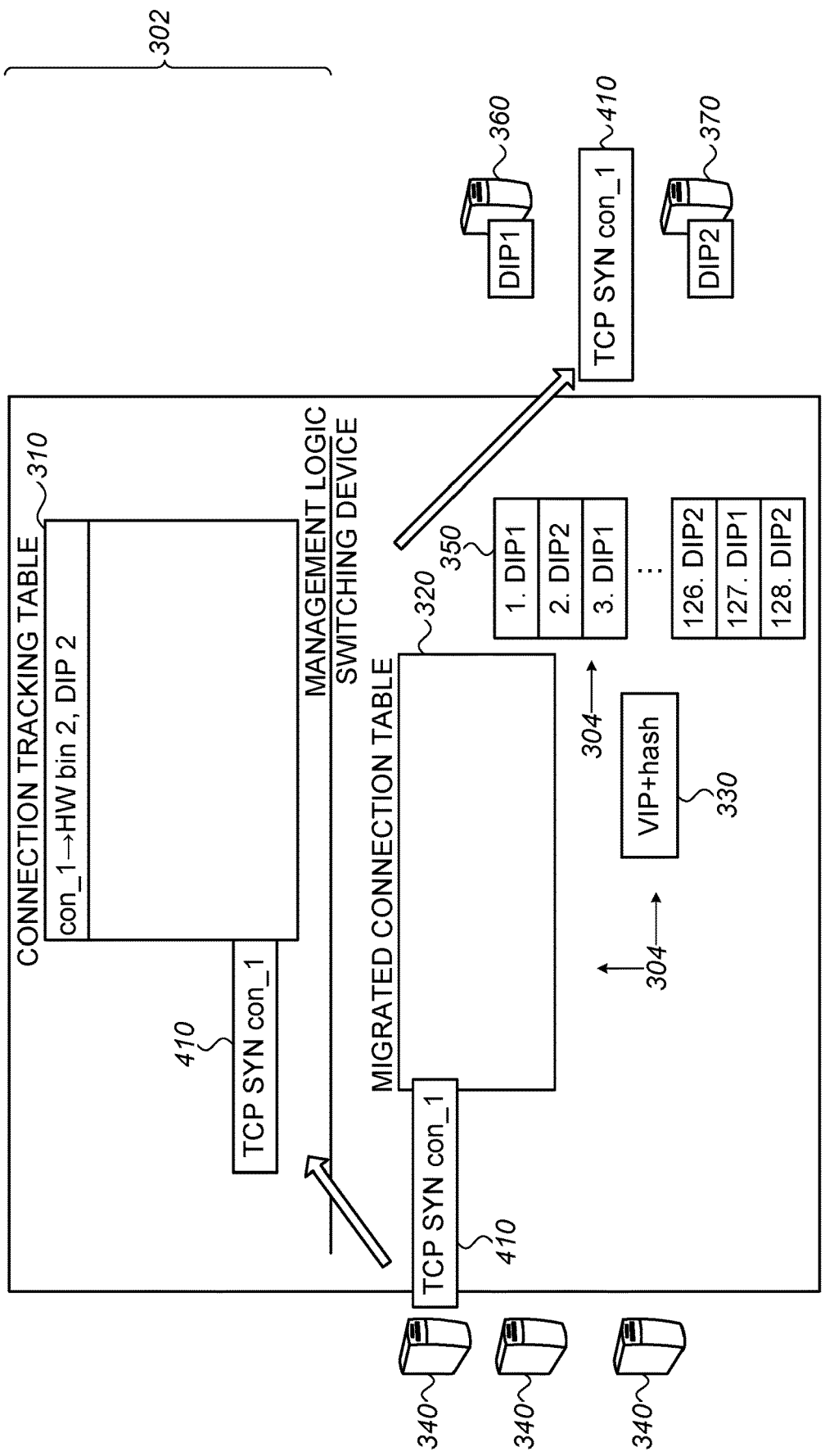
FIGS. 4-11 are simplified pictorial illustrations of the system of FIG. 3, showing various exemplary states of operation thereof.

In FIG. 4, a TCP SYN message is received in an incoming TCP SYN packet 410. As it known to persons skilled in the art, the TCP SYN message comprises the first step in setting up a TCP connection, the TCP connection being labeled for simplicity of depiction and description as a first TCP connection "con_1" in FIG. 4 and following drawings.

The TCP SYN packet 410 is received for ingress processing by the switching device 304. In the switching device 304 (in a process that is not shown in FIG. 4), the TCP SYN packet 410 is forwarded to the management logic 302. A non-limiting example of such a mechanism may comprise use of an Access Control List (ACL) rule entry (which may be implemented in HW within the switching device 304) that matches on the TCP SYN/FIN/RST packet header flags. If a match is found for a given packet, the given packet is redirected instead to the management logic 302 for processing. The TCP SYN packet 410 is processed, including via the VIP+hash mapping unit 330, in order to determine a DIP target for the TCP SYN packet 410; in the case of the example depicted in FIG. 4, the VIP+hash mapping unit 330 determines that the target for the TCP SYN packet 410 is DIP 2 370, via bin 2 in the lookup table 350.

Since the TCP SYN packet 410 comprises one step in setting up a TCP connection, the TPC SYN packet 410 is sent by the switching device 304 to the management logic 302, where the TCP SYN packet 410 is analyzed and used to create an entry in the connection tracking table 310 indicating that TCP connection con_1 is mapped to DIP 2 via bin 2 in the lookup table 350. Since, in certain embodiments of the present invention, per-connection consistency (PCC) is to be maintained across the load balancing functionality even subsequent to DIP update, it is useful for the TCP SYN packet 410 to be sent to the management logic 302 and for an entry in the connection tracking table 310 described immediately above to be created, and subsequently or substantially simultaneously the TCP SYN packet 410 is sent on to DIP2 370; as will be appreciated with respect to the below description of subsequent drawings, the connection tracking table 310 plays a role in maintaining PCC. It will further be appreciated by persons skilled in the art that, in the case of a TCP SYN packet such as the TCP SYN packet 410, the above-mentioned process is acceptable, even though a certain time delay is introduced in arrival of the TCP SYN packet 410 at DIP2 370, since (within a certain time range, as is known to persons skilled in the art) TCP SYN packet processing is not time-critical.

Figure 5:
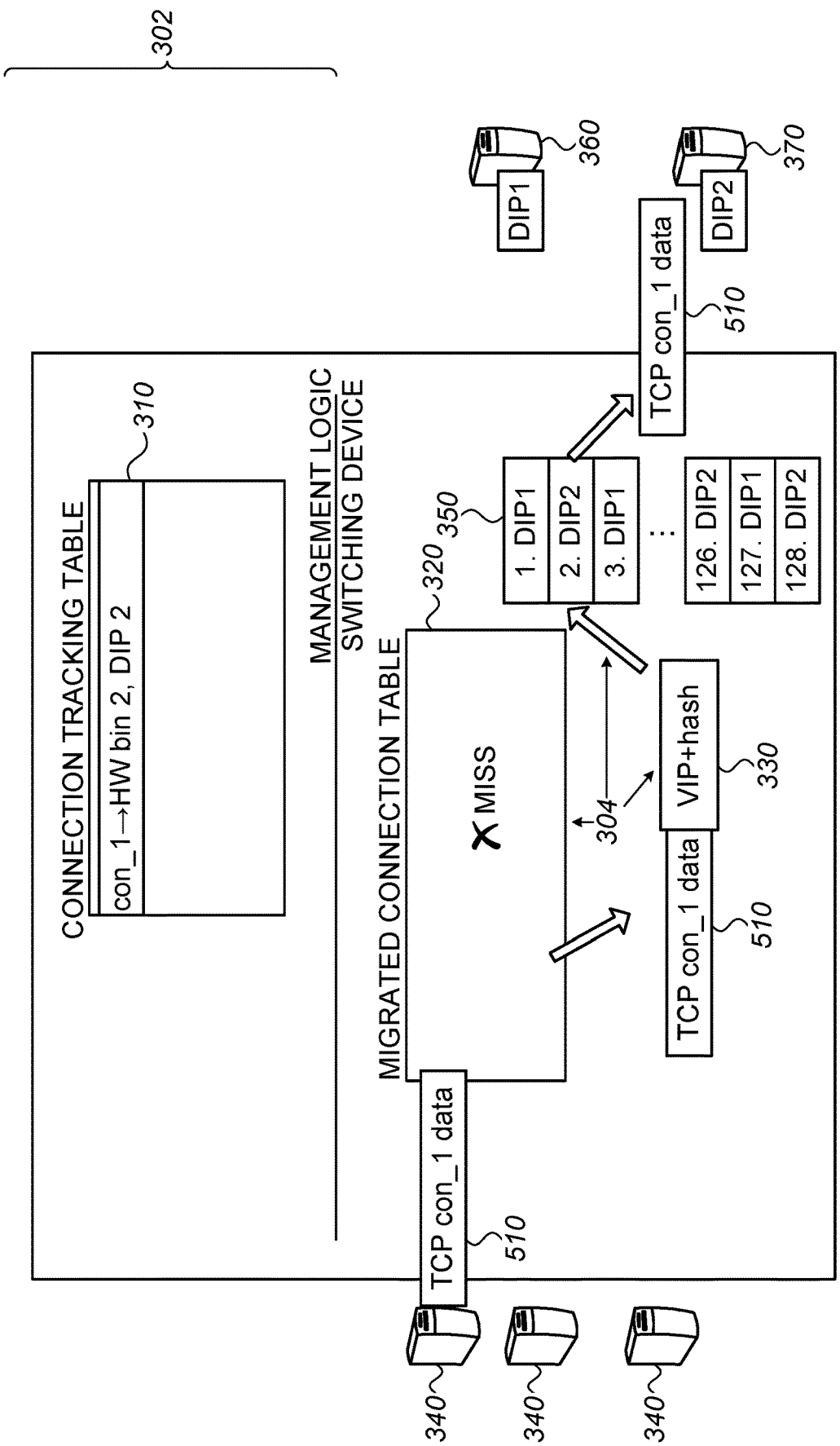

In FIG. 5 a TCP data packet 510 directed to connection con_1 is received. The TCP data packet 510 is processed in the switching device 304, being first sent to the migrated connection table 320. If no entry for con_1 is found in the migrated connection table 320 ("a miss"), the miss indicates that the DIP destination for con_1 has not changed. In such a case, the TCP data packet 510 is processed normally, by being sent to the VIP+hash mapping unit 330, where it is determined that the appropriate target DIP for the TCP data packet 510, via bin 2 in the lookup table 350, is DIP2 370.

It is important for the switching device 304 hash mapping to be consistent with that used by the management logic 302 hash mapping to process the TCP SYN packet from the start of the connection. Therefore, the TCP data packet 510 is sent on to DIP2 370, the same DIP as for packet 410 that was processed by the management logic connection tracking table 310. Persons skilled in the art will appreciate that in such a "normal" case, the TCP data packet 510 is processed quickly and efficiently, since processing thereof takes place in the switching device 304.

Figure 6:
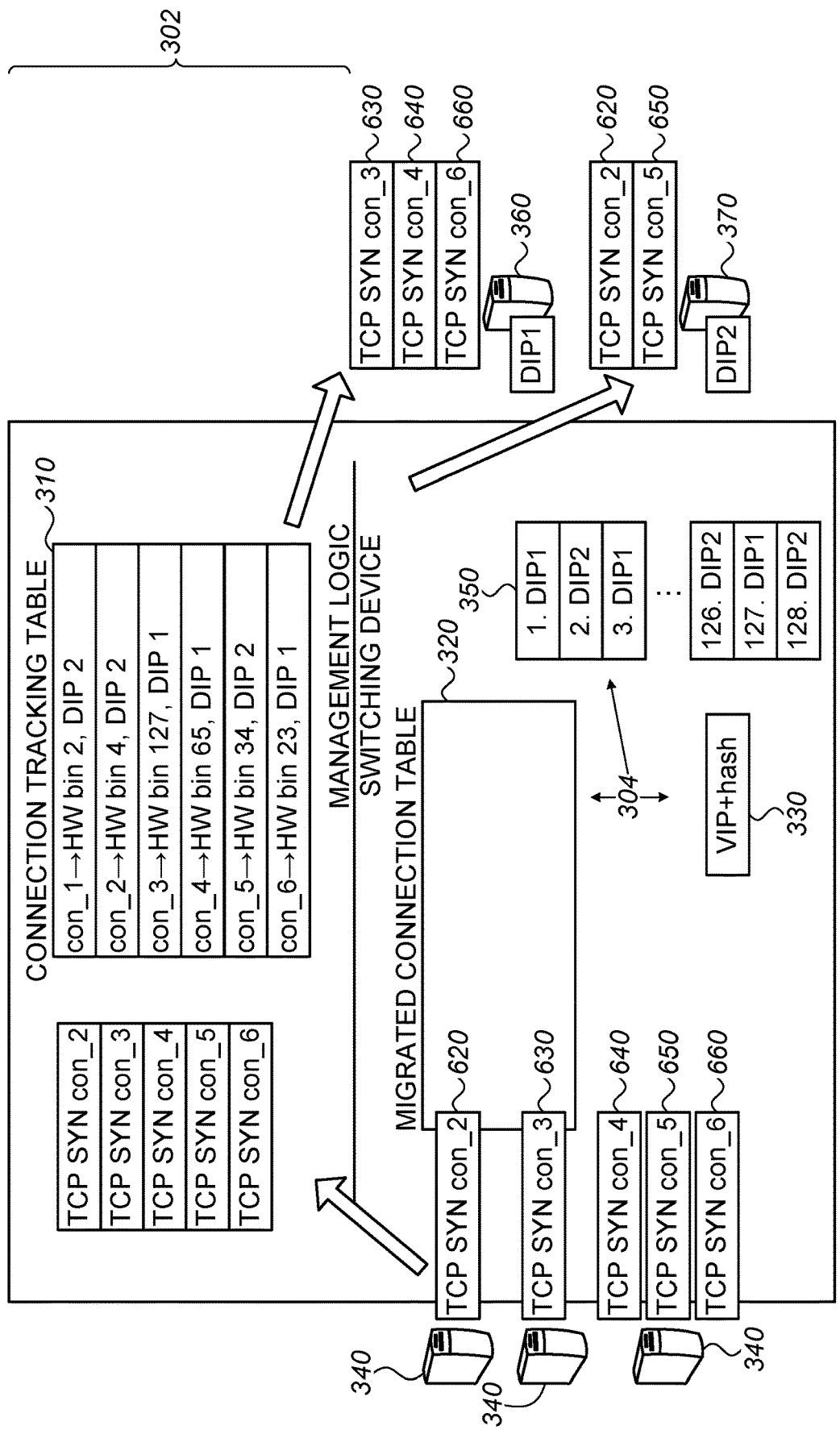

In FIG. 6, conceptually continuing what is shown in FIG. 4 and described above with reference to FIG. 4, TCP SYN packets 620 (for con_2), 630 (for con_3), 640 (for con_4), 650 (for con_5), and 660 (for con_6) are received. Each of TPC SYN packets 620, 630, 640, 650, and 660 are processed similarly to the processing of TCP SYN packet 410 of FIG. 4 as described above, with entries being made accordingly in the connection tracking table 310, with the following bin and DIP assignments:

| TCP SYN packet | bin in lookup table 350 | DIP |
|---|---|---|
| 620 con_2 | 4 | 2 |
| 630 con_3 | 127 | 1 |
| 640 con_4 | 65 | 1 |
| 650 con_5 | 34 | 2 |
| 660 con_6 | 23 | 1 |

Similarly to the depiction in FIG. 4 and as described above with reference to FIG. 4, in the system of FIG. 6 each of the TCP SYN packets 620, 630, 640, 650, and 660 depicted in FIG. 6 is directed to the management logic 302 for processing (in a process that is not shown in FIG. 4). The TCP SYN packets 620-660 are processed by the connection tracking table 310 in order to determine the switching device bin and DIP target for each of the TCP SYN packets 620-660, thus further populating the connection tracking table 310. In the case of the example depicted in FIG. 6, the connection tracking table 310 processing is equivalent to the processing which takes place in the VIP+hash mapping unit 330, which latter processing is used to determine the target for the TCP SYN packets 620-660 as is shown in the table above.

Again, similarly to the description of FIG. 4, in FIG. 6 at the completion of the management logic 302 packet processing, each of the TCP SYN packets 620-660 is penultimately sent to back to the switching device 304, upon which each said packet is egressed to the correct DIP server.

Figure 7:
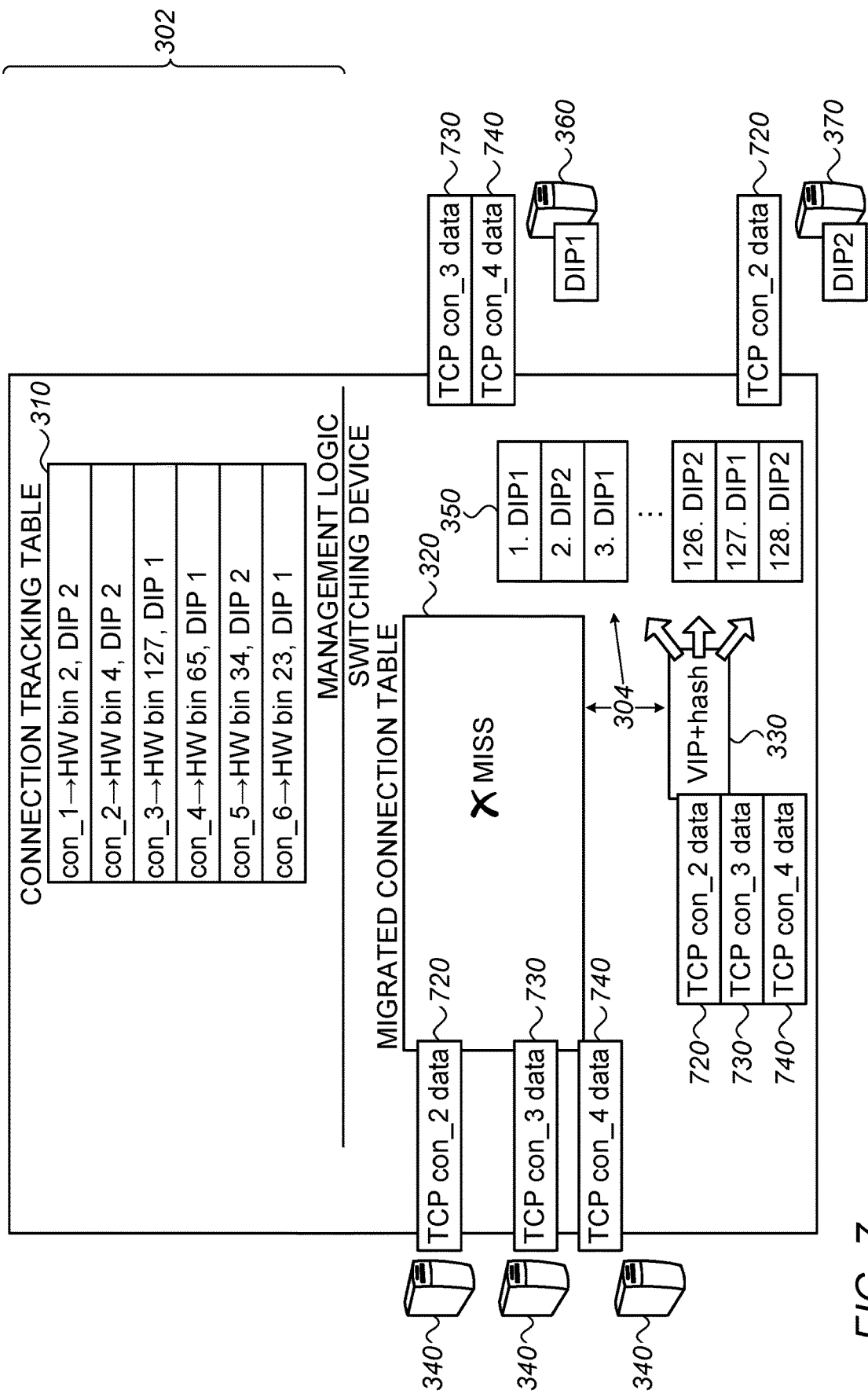

In FIG. 7, conceptually similarly to FIG. 5 and to the description thereof above, TCP data packets 720 (directed to connection con_2), 730 (directed to connection con_3), and 740 (directed to connection con_4) are received. The TCP data packets 720-740 are generally processed entirely in the switching device 304. If no prior entries for con_2, con_3, and con_4 are found in the migrated connection table 320 ("a miss" in each case), the misses indicate that the DIP destinations for con_2, con_3, and con_4 have not changed. In such a case, the TCP data packet 720-740 are processed normally, by being sent to the VIP+hash mapping unit 330, where the appropriate target for each of the TCP data packets 720-740 are determined:

TCP data packet 720 to DIP2 370 via bin 4;
TCP data packet 730 to DIP1 360 via bin 127; and
TCP data packet 740 to DIP1 360 via bin 65, and each TCP data packet 720-740 being then sent to the appropriate DIP. Persons skilled in the art will appreciate that in such a "normal" case, the TCP data packets 720-740 are processed quickly and efficiently, since processing thereof takes place in the switching device 304.

Figure 8:
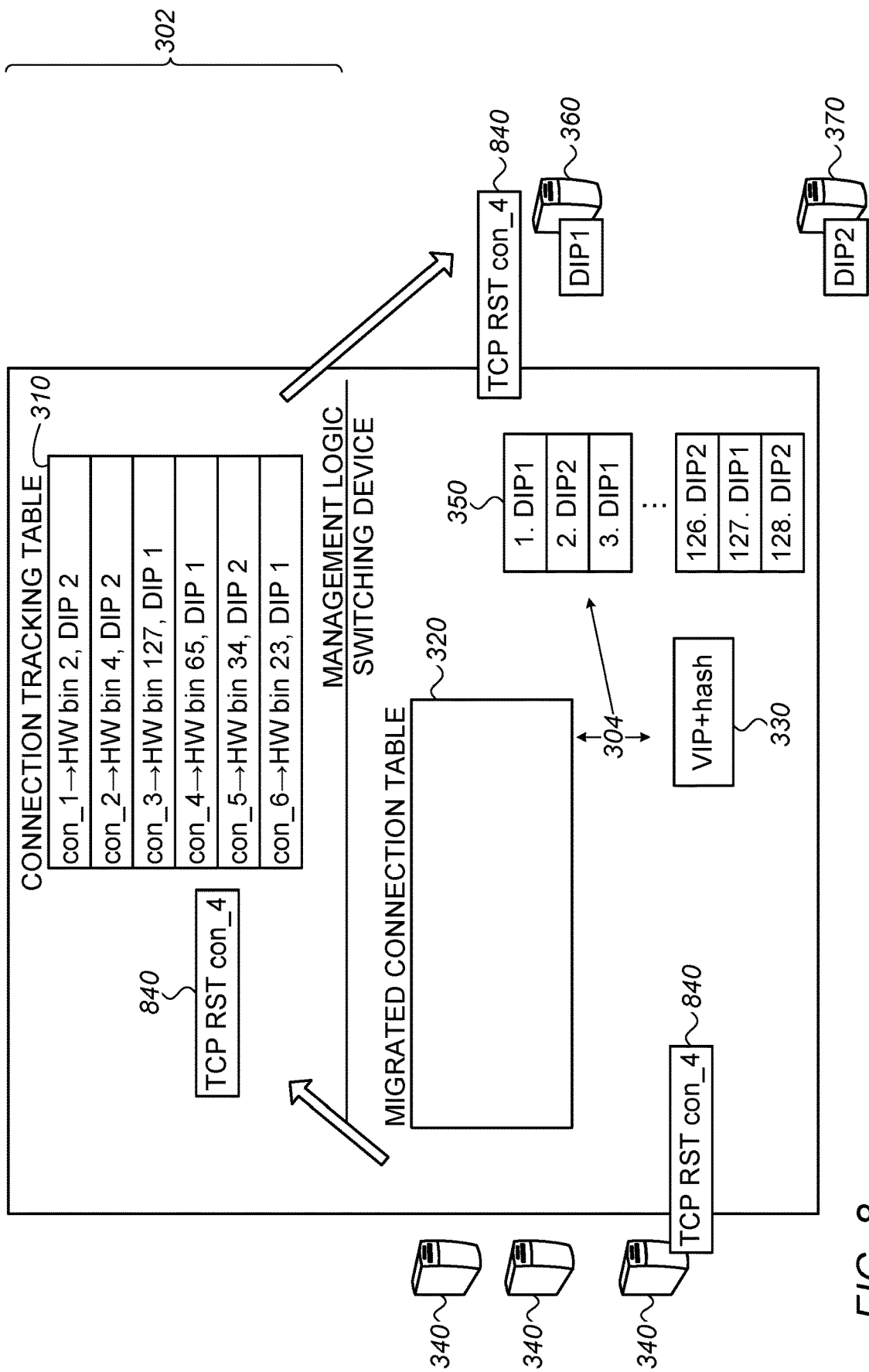
Figure 9:
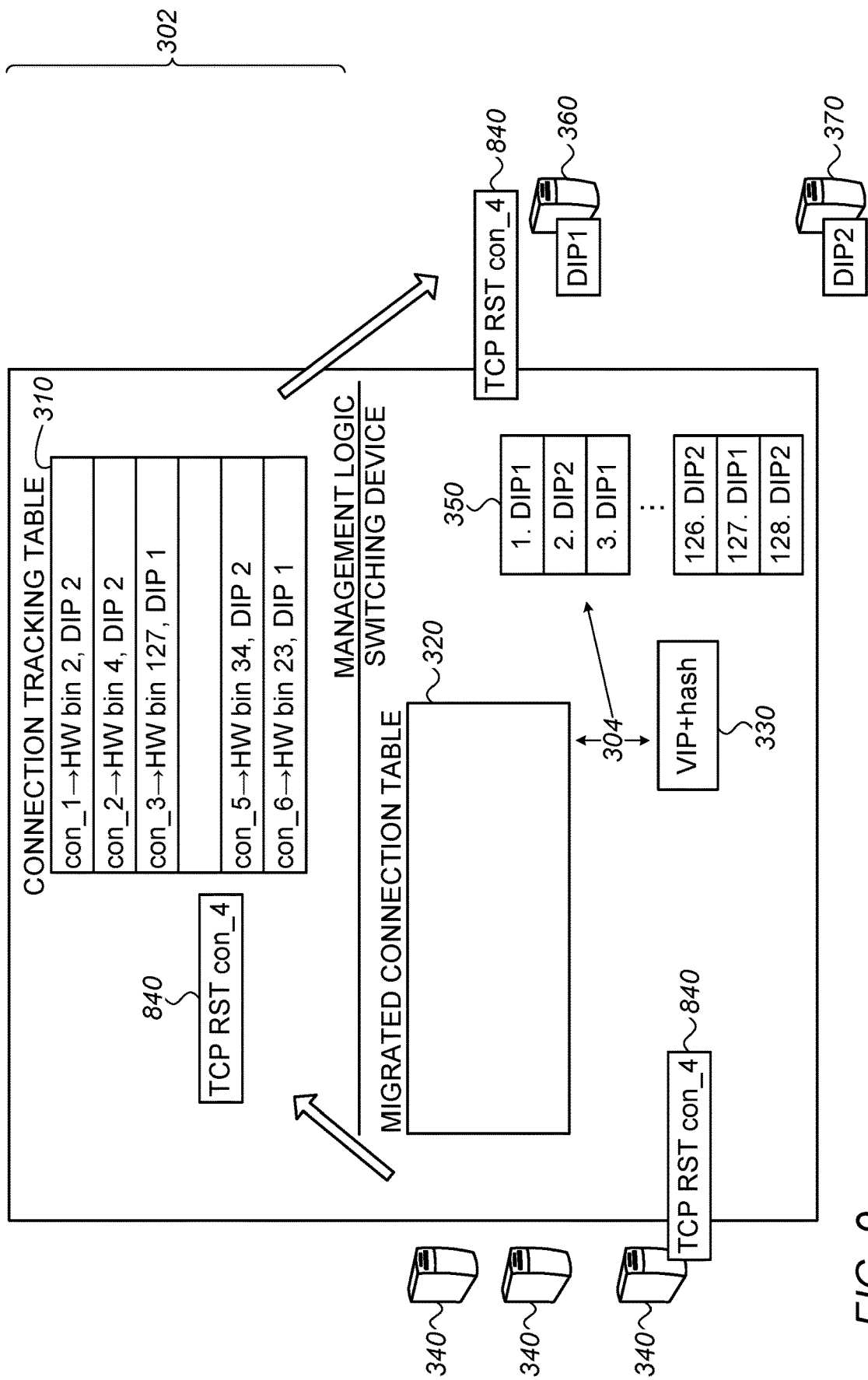

In FIGS. 8 and 9, a TCP FIN (or equivalently a TCP RST) packet 840 for connection con_4 is received. Persons skilled in the art will appreciate that a TCP FIN packet indicates that a connection (in this case connection con_4) is to be closed. Therefore, the TCP FIN packet 840 is sent on to the connection tracking table 310, and thence to the DIP1 360; as is shown in FIG. 9, the entry in the connection tracking table 310 for connection con_4 has been erased.

The situation shown in FIGS. 8 and 9 and described immediately above is analogous in certain ways to the situation shown in FIG. 4 and described above with reference thereto. Since, in certain embodiments of the present invention, per-connection consistency (PCC) is to be maintained across the load balancing functionality even subsequent to DIP update, it is useful for the TCP FIN packet 840 to be sent to the management logic 302 and for the entry in the connection tracking table 310 corresponding thereto to be deleted so that the connection tracking table 310 remains complete and consistent. Subsequently to the update of the connection tracking table 310 or substantially simultaneously thereto, the TCP FIN packet 840 is sent on to DIP1 360; as will be appreciated with respect to the below description of subsequent drawings, the connection tracking table 310 plays a role in maintaining PCC. It will further be appreciated by persons skilled in the art that, in the case of a TCP FIN packet such as the TCP FIN packet 840, the above-mentioned process is acceptable, even though a certain time delay is introduced in arrival of the TCP FIN packet 410 at DIP1 360, since (within a certain time range, as is known to persons skilled in the art) TCP FIN packet processing is not time-critical.

However, it will be further appreciated that, should a certain time range be exceeded, a sender (such as one of the clients 340) of the TCP FIN packet 410 may experience a time out due to delays introduced by the process described immediately above. This is an undesirable occurrence; hence, in certain embodiments, TCP FIN packets which arrive may be processed on a bin-by-bin basis in order to achieve quicker processing and less delay time.

Figure 10:
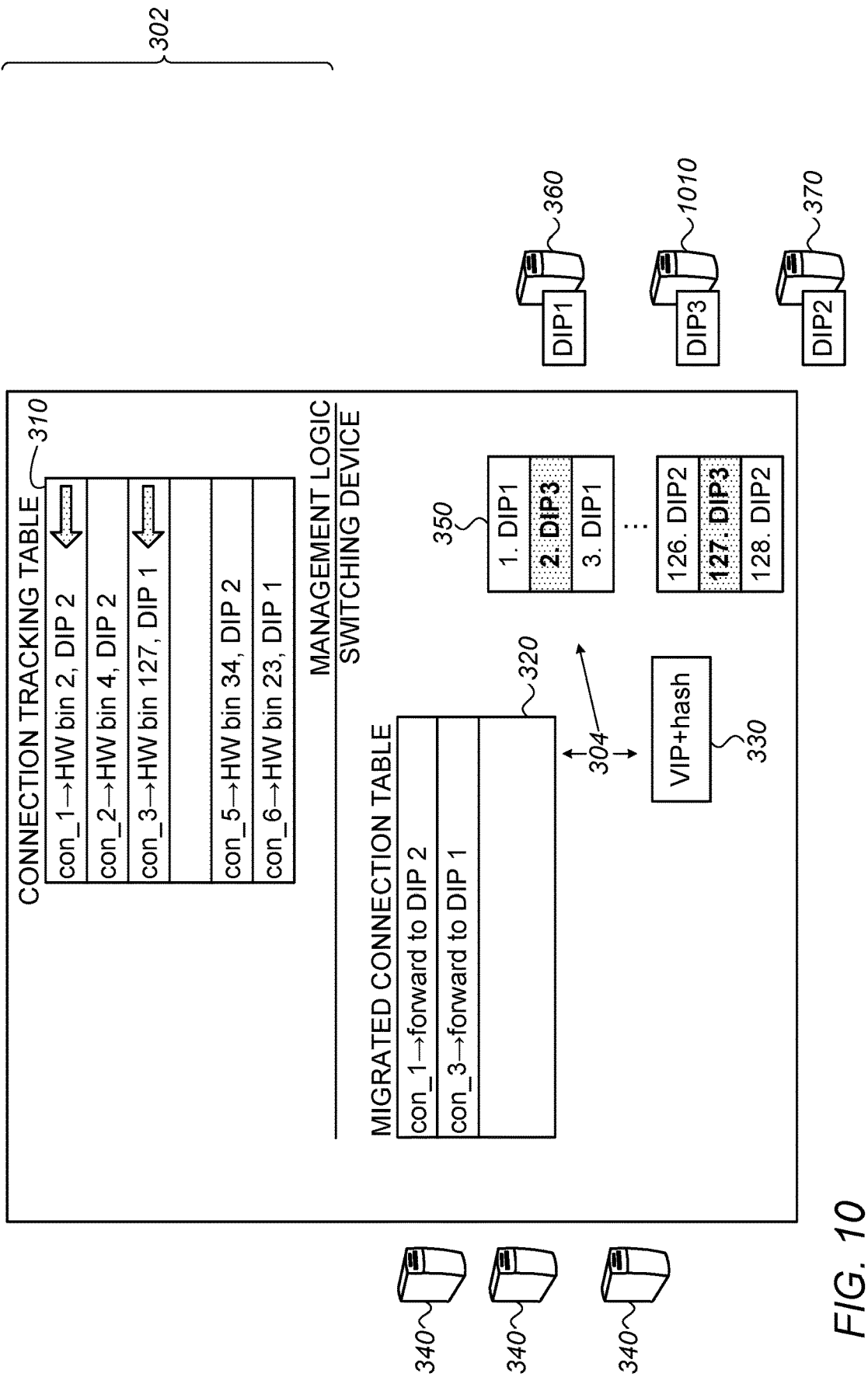

In FIG. 10 an additional DIP, DIP3 1010, has been added to the system. In order to maintain load balancing across the DIPs comprising DIP1 360, DIP2 370, and DIP3 1010, it is desirable to spread incoming VIP traffic substantially equally across the DIPs. As depicted in FIGS. 1 and 2 and described above with reference thereto, addition or removal of a DIP may be accompanied by a change in an appropriate function such as, by way of non-limiting example, a modulo function (see above description of main mapping units 130 of FIG. 1 and 135 of FIG. 2); a modulo function would, in certain specific embodiments of the present invention, be included in the functionality of the VIP+hash mapping unit 330. Thus, in FIG. 10, and continuing with the specific example of a modulo function, the modulo function would (for example) change from a % 2 function distributing over DIP1 360 and DIP2 370, to a % 3 function distributing over DIP 1 360, DIP2 370, and DIP3 1010. Persons skilled in the art will appreciate that such a change will generally cause changes in a plurality of DIP assignments for existing TCP connections (depending on the number of existing TCP connections).

In the particular case depicted in FIG. 10, bins 2 and 127 are involved in existing TCP connections for which the change in modulo function (for example) has caused a change in corresponding entries in the lookup table 350:

bin 2 of the lookup table 350, which is used for connection con_1 and which formerly pointed to DIP2 370, now will point to DIP3 1010; and bin 127 of the lookup table 350, which is used for connection con_3 and which formerly pointed to DIP 1 360, now will point to DIP2 1010.

In order to maintain per connection consistency (PCC), information on connections con_1 and con_3 is entered into the migrated connection table 320; in certain embodiments, said information originates in the connection tracking table 310. As described above with reference to FIG. 7, when a TCP data packet arrives for which no entry is found in the migrated connection table 320 ("a miss"), the miss indicates that the DIP destination has not changed and that such a TCP data packet is to be processed normally via the VIP+hash mapping unit 330. However, in the case shown in FIG. 10, should a TCP data packet arrive for either TCP connection con_1 or for TCP connection con_3 an entry will be found in the migrated connection table 320 ("a hit"). A hit indicates that an incoming TCP data packet should be processed in accordance with the information in the migrated connection table 320 and not in accordance with normal processing. Without limiting the generality of the foregoing, in the particular case shown in FIG. 10, an incoming TCP data packet for con_1 will be sent to DIP2 370, while an incoming TCP data packet for con_3 will be sent to DIP1 360.

It will be appreciated, as shown in FIG. 10, that the processing described for a case of a hit in the migrated connection table 320 takes place in the switching device 304, as does processing the case of a miss; thus, processing still takes place quickly despite the connection having been migrated. It will also be appreciated that, in most cases, the migrated connection table 320 need not be particularly large compared to the connection tracking table 310.

Figure 11:
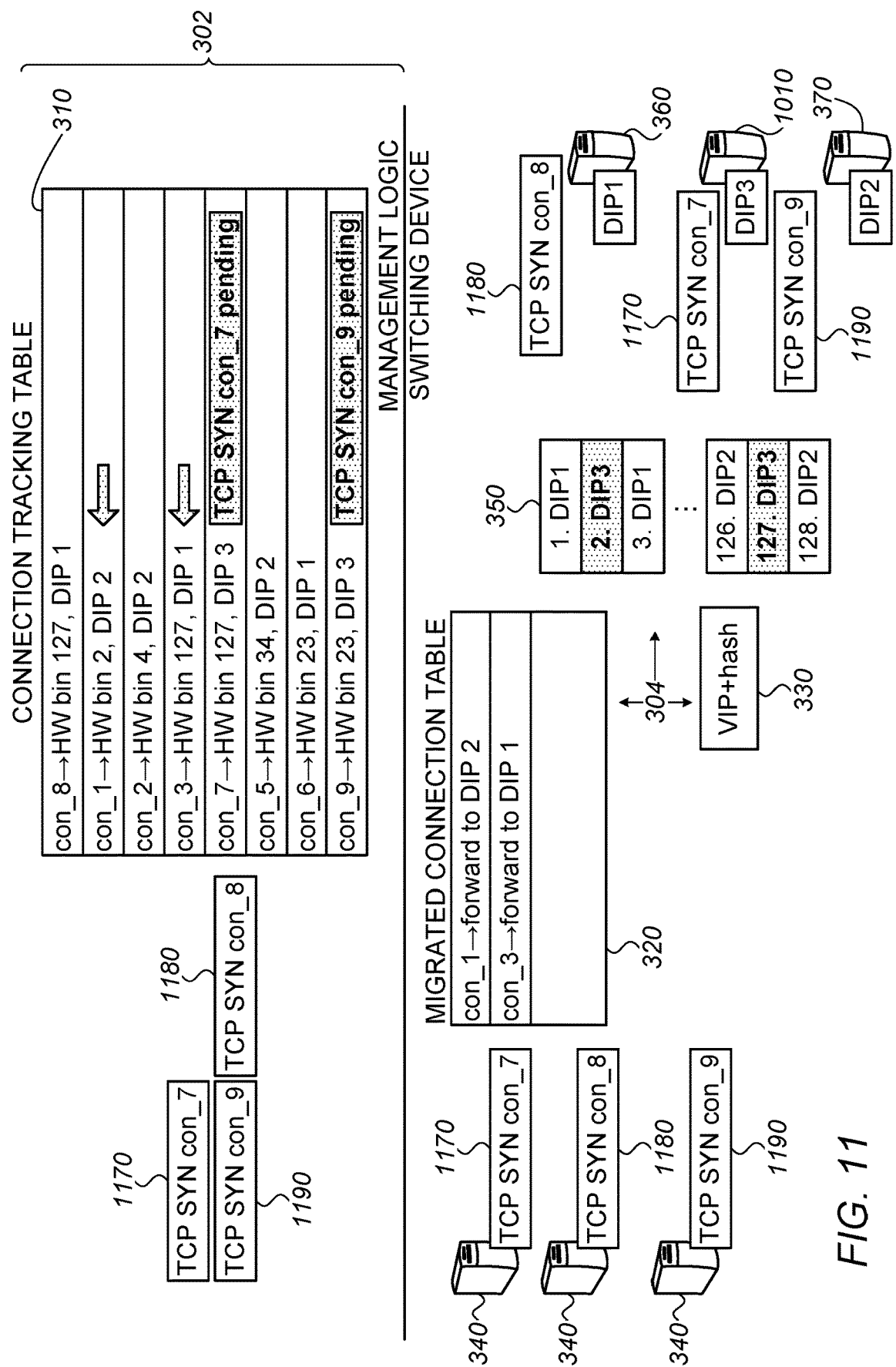

In FIG. 11, a DIP change (in this case, adding a DIP) has been announced to the connection tracking table 310, via an appropriate external entity (not shown). While the system is updating the new bin mappings in both the connection tracking table 310 and the VIP+hash mapping unit 330, TCP SYN packets arrive for additional connections: TCP SYN packet 1170 for con_7; TCP SYN packet 1180 for connection con_8; and TCP SYN packet 1190 for connection con_9. In order to retain PCC during the DIP update, connections in the connection tracking table 310 for con_7 and con_9 are marked as pending, because those connections relate to the added DIP3 1010, while the new connection for con_8 need not be marked pending, as it relates to an existing DIP1 360. Persons skilled in the art will appreciate that the discussion of FIG. 11 may also apply in a case where a DIP is removed, mutatis mutandis. In a case where a DIP is removed due to a planned event (such as, for example, a manager or a management unit taking a DIP offline due to a decision process), the discussion of FIG. 11 may indeed apply; on the other hand, if a DIP should go off line, causing associated connections to become not active, due to an unexpected event (such as a so-called "crash" of a DIP), then the discussion of FIG. 11 may not apply, and the associated connections may be "lost".

It will be further appreciated that, in the event that the termination of a connection is not reliably detected (for example, given the absence of TCP FIN or TCP RST packets from the sender) both the connection tracking table 310 and the migrated connection table 320 may consume excessive resources. This is an undesirable occurrence; hence, in certain embodiments, monitoring of connection data packets that arrive, may be performed in the switching device 304, typically using a HW counter. The switching device 304 may also monitor an amount of time (represented by counter value per connection) for which a connection has not been active. Removing connections which are not active from tables 320 and 310 after a maximal not-active time-out is exceeded then reclaims the desired connection resources. Furthermore, the remaining connections in the connection tracking table 310 may be monitored using a HW hash with a single connection per bin, combined with a sliding window, over a subset of connections. It is appreciated that iteration of the foregoing procedure and incrementing the window will process the entire connection tracking table 310 for connection inactivity. It will be further appreciated by persons skilled in the art, that a Bloom filter, if implemented in HW, combined with an appropriately sized bit vector of memory, may also be implemented in certain embodiments of the present invention.

Figure 12:
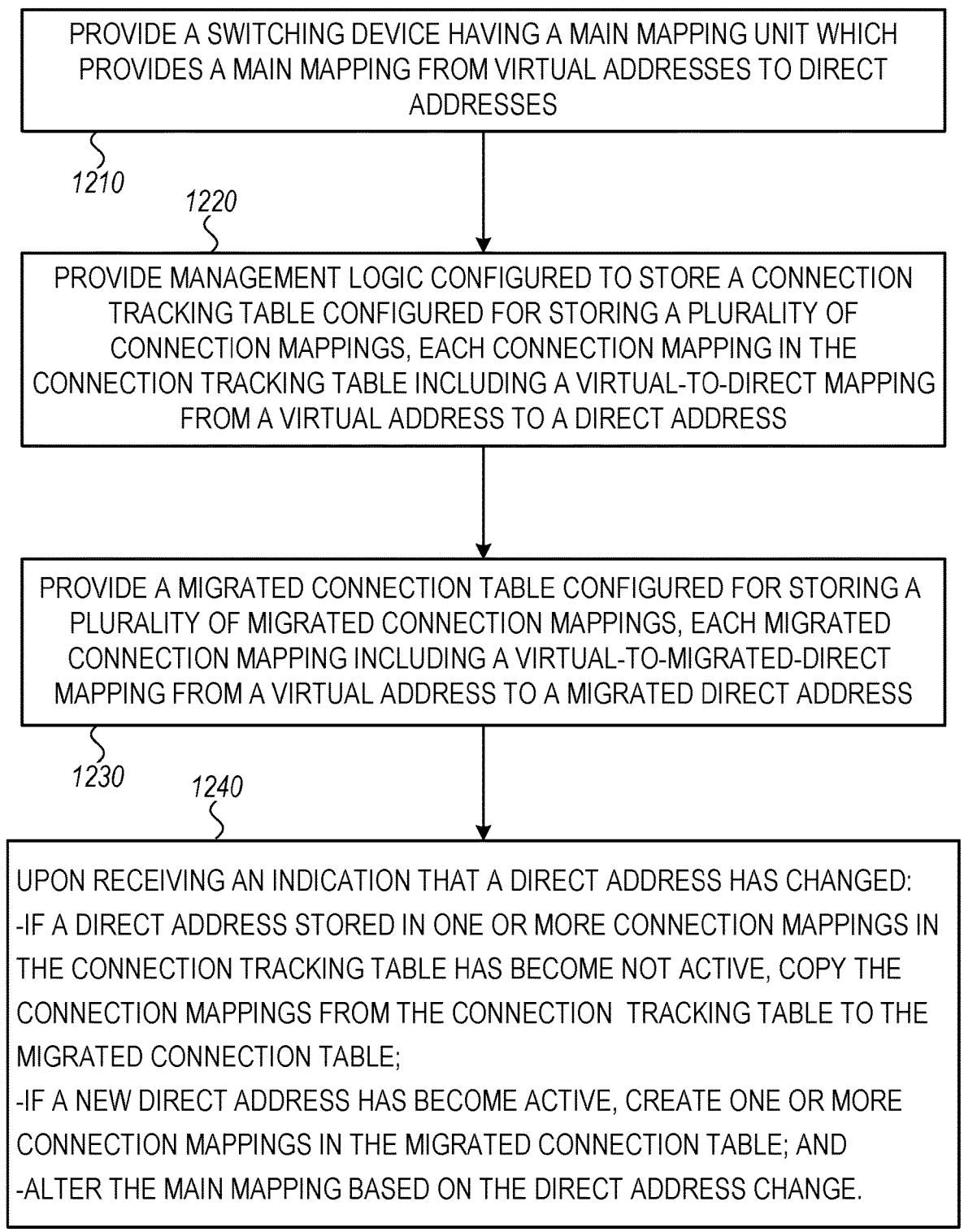
FIG. 12 is a simplified flowchart illustration of an exemplary method of operation of the system of FIG. 1.

Reference is now made to FIG. 12, which is a simplified flowchart illustration of an exemplary method of operation of the system of FIG. 1. The method of FIG. 12, which is largely self-explanatory with reference to the above description of FIGS. 1-11, comprises the following steps:

A switching device (such as the switching device 304) having a main mapping unit (such as the VIP+hash mapping unit 330) which provides a main mapping from virtual addresses to direct addresses is provided (step 1210). The direct address may be a non-virtual address.

Management logic (such as the management logic 302) is provided; the management logic is configured to store a connection tracking table (such as the connection tracking table 310). The connection tracking table is configured for storing a plurality of connection mappings, each such mapping in the connection tracking table including a virtual-to-direct mapping from a virtual address to a direct address (step 1220).

A migrated connection table (such as the migrated connection table 320 in the switching device 304) is provided. The migrated connection table is configured for storing a plurality of migrated connection mappings, each such mapping including a virtual-to-migrated-direct mapping from a virtual address to a migrated direct address (step 1230).

Step 1240: When an indication that a direct address has changed is received (the indication being generally received from outside the apparatus shown and described above, and being generally received at the switching device 304):

If a direct address stored in one or more connection mappings in the connection tracking table has become not active, the management logic copies the connection mappings from the connection tracking table to the migrated connection table;

If a new direct address has become active, the switching device creates one or more connection mappings in the migrated connection table; and The switching device alters the main mapping based on the direct address change.

Figure 13:
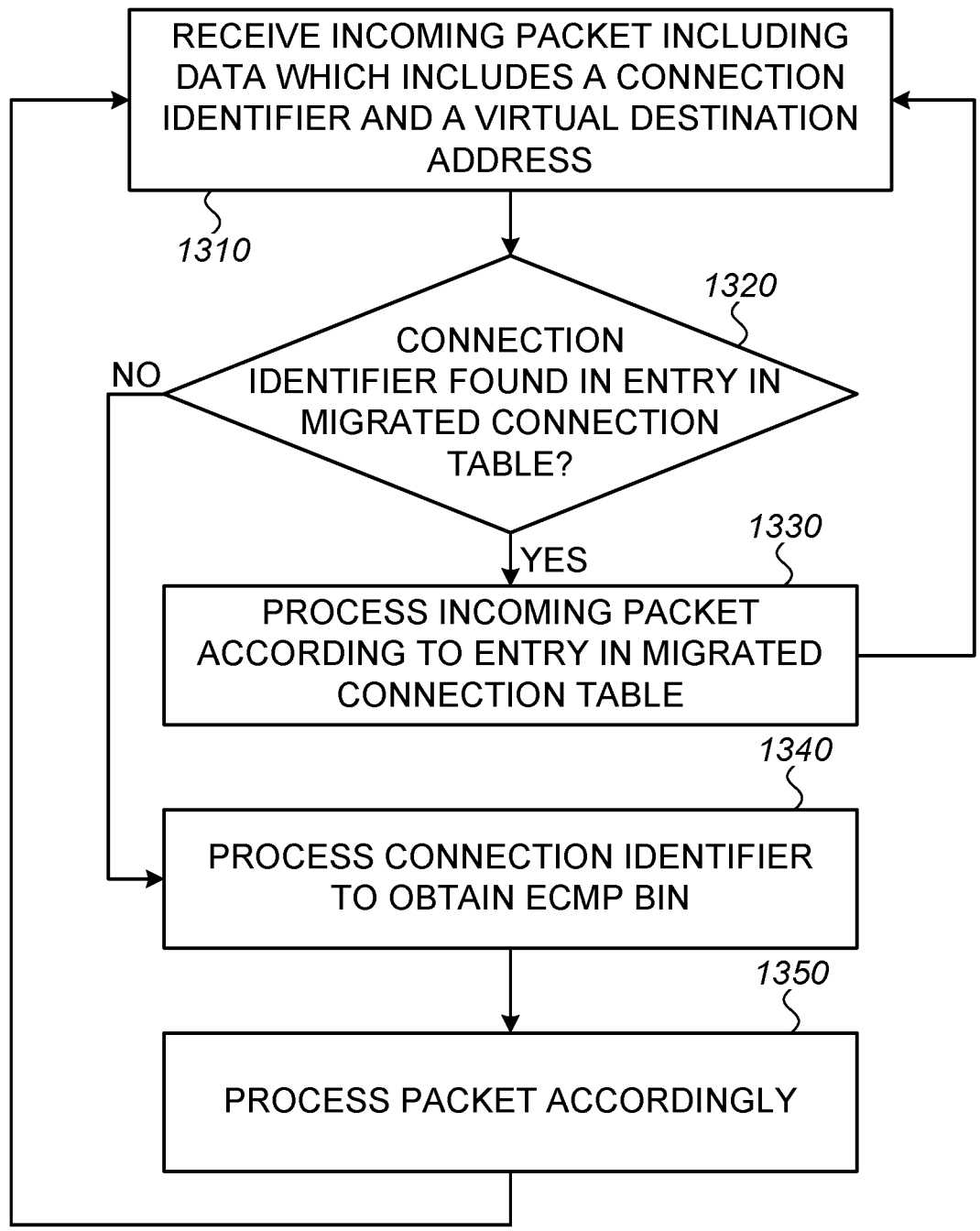
FIG. 13 is a simplified flowchart illustration of another exemplary method of operation of the system of FIG. 1.

Reference is now made to FIG. 13, which is a simplified flowchart illustration of another exemplary method of operation of the system of FIG. 1. The method of FIG. 13, which is largely self-explanatory with reference to the above description of FIGS. 1-11, comprises the following steps:

An incoming packet is received by the switching device; the packet includes data that includes a connection identifier and a virtual destination address (step 1310).

A check is made by the switching device as to whether the connection identifier is found in an entry in the migrated connection table (step 1320). If "yes", processing proceeds with step 1330; if "no", processing proceeds with step 1340.

In step 1330, the switching device process the packet in accordance with an appropriate entry in the migrated connection table; processing then proceeds with step 1310.

In step 1340, the switching device processes the connection identifier in the packet (for example, by hashing) to determine an appropriate ECMP bin; the packet is then processed accordingly in step 1350; processing then proceeds with step 1310.

While the method of FIG. 13 has been shown and described as processing a plurality of incoming packets, with processing looping back to step 1310 after each packet is processed and with another packet being received in step 1310, it is appreciated that, alternatively, the method of FIG. 13 may be used to process only a single packet.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   providing a switching device comprising a main mapping unit configured to provide a main mapping which maps virtual addresses to direct addresses;
   providing management logic configured to store a connection tracking table stored in memory and configured for storing a plurality of connection mappings, each connection mapping in said connection tracking table comprising a virtual-to-direct mapping from a virtual address to a direct address;
   providing a migrated connection table stored in memory and configured for storing a plurality of migrated connection mappings, each migrated connection mapping comprising a virtual-to-migrated-direct mapping from a virtual address to a migrated direct address; and
   upon receiving an indication that a direct address has changed:
      when said indication that a direct address has changed comprises an indication that a direct address stored in one or more connection mappings in the connection tracking table is not active, copying said one or more connection mappings from the connection tracking table to the migrated connection table;
      when said indication that a direct address has changed comprises an indication that a new direct address has become active, creating one or more connection mappings in the migrated connection table; and
      altering the main mapping in accordance with the direct address change.

2. The method according to claim 1 and also comprising:
upon receiving an indication that a new connection is desired for a given virtual address:
establishing a new connection mapping from the given virtual address to a new connection direct address; and
storing the new connection mapping in the connection tracking table.

3. The method according to claim 1 and wherein each said direct address comprises a non-virtual destination address.

4. The method according to claim 1 and wherein said indication that a direct address stored in one or more connection mappings in the connection tracking table is not active comprises an indication of whether the one or more connections became not active due to a planned event or due to an unexpected event, and
said copying said one or more connection mappings is conditionally performed based on said indication of whether the one or more connections became not active indicating that said one or more connections became not active due to a planned event.

5. The method according to claim 1, and wherein said main mapping unit is configured to carry out a hash function and a modulo function.

6. The method according to claim 1 and also comprising:
receiving a message directed to a desired connection, the message comprising a received virtual address;
attempting to find a mapping for the desired connection in the migrated connection table;
when a mapping from the received virtual address is found in the migrated connection table, sending the message onward in accordance with a migrated direct address found in the mapping in the migrated connection table; and
when a mapping from the received virtual address is not found in the migrated connection table, sending the message onward in accordance with the main mapping.

7. Apparatus comprising:
a switching device comprising hardware logic, the hardware logic implementing a main mapping unit and management logic, the main mapping unit being configured to provide a mapping which maps virtual addresses to direct addresses,
the management logic being configured to store a connection tracking table configured for storing a plurality of connection mappings, each connection mapping comprising a virtual-to-direct mapping from a virtual address to a direct address; and
a migrated connection table comprised in memory and configured for storing a plurality of migrated connection mappings, each migrated connection mapping comprising a virtual-to-migrated-direct mapping from a virtual address to a migrated direct address,
the apparatus being configured, upon receiving an indication that a direct address has changed to perform the following:
when said indication that a direct address has changed comprises an indication that a direct address stored in one or more connection mappings in the connection tracking table is not active, copy said one or more connection mappings from the connection tracking table to the migrated connection table;
when said indication that a direct address has changed comprises an indication that a new direct address has become active, create one or more connection mappings in the migrated connection table; and
alter the main mapping in accordance with the direct address change.

8. Apparatus according to claim 7 and wherein the apparatus is also configured, upon receiving an indication that a new connection is desired for a given virtual address, to perform the following:
establish a new connection mapping from the given virtual address to a new connection direct address; and
store the new connection mapping in the connection tracking table.

9. Apparatus according to claim 7 and wherein each said direct address comprises a non-virtual destination address.

10. Apparatus according to claim 7 and wherein said indication that a direct address stored in one or more connection mappings in the connection tracking table is not active comprises an indication of whether the one or more connections became not active due to a planned event or due to an unexpected event, and
said apparatus is configured to copy said one or more connection mappings conditionally based on said indication of whether the one or more connections became not active indicating that said one or more connections became not active due to a planned event.

11. Apparatus according to claim 7, and wherein said main mapping unit is configured to carry out a hash function and a modulo function.

12. Apparatus according to claim 7 and wherein said apparatus is further configured:
to receive a message directed to a desired connection, the message comprising a received virtual address;
to attempt to find a mapping for the desired connection in the migrated connection table;
when a mapping from the received virtual address is found in the migrated connection table, to send the message onward in accordance with a migrated direct address found in the mapping in the migrated connection table; and
when a mapping from the received virtual address is not found in the migrated connection table, to send the message onward in accordance with the main mapping.

13. A method comprising:
providing a switching device comprising a main mapping unit configured to provide a main mapping which maps virtual addresses to direct addresses;
providing management logic configured to store a connection tracking table stored in memory and configured for storing a plurality of connection mappings, each connection mapping comprising a virtual-to-direct mapping from a virtual address to a direct address;
providing a migrated connection table stored in memory and configured for storing a plurality of migrated connection mappings, each migrated connection mapping comprising a virtual-to-migrated-direct mapping from a virtual address to a migrated direct address;
receiving a message directed to a desired connection, the message comprising a received virtual address;
attempting to find a mapping for the desired connection in the migrated connection table;
when a mapping from the received virtual address is found in the migrated connection table, sending the message onward in accordance with a migrated direct address found in the mapping in the migrated connection table; and
when a mapping from the received virtual address is not found in the migrated connection table, sending the message onward in accordance with the main mapping.

14. The method according to claim 13 and wherein each said direct address comprises a non-virtual destination address.

15. The method according to claim 13 and wherein said main mapping unit is configured to carry out a hash function and a modulo function.

16. Apparatus comprising:
a switching device comprising hardware logic, the hardware logic implementing a main mapping unit and management logic, the main mapping unit being configured to provide a main mapping which maps virtual addresses to direct addresses,
the management logic being configured to store in memory a connection tracking table configured for storing a plurality of connection mappings, each connection mapping comprising a virtual-to-direct mapping from a virtual address to a direct address; and
a migrated connection table comprised in memory and configured for storing a plurality of migrated connection mappings, each migrated connection mapping comprising a virtual-to-migrated-direct mapping from a virtual address to a migrated direct address,
the apparatus being configured, upon receiving a message directed to a desired connection, the message comprising a received virtual address, to perform the following:
attempt to find a mapping for the desired connection in the migrated connection table;
when a mapping from the received virtual address is found in the migrated connection table, send the message onward in accordance with a migrated direct address found in the mapping in the migrated connection table; and
when a mapping from the received virtual address is not found in the migrated connection table, send the message onward in accordance with the main mapping.

17. Apparatus according to claim 16 and wherein each said direct address comprises a non-virtual destination address.

18. Apparatus according to claim 16, and wherein said main mapping unit is configured to carry out a hash function and a modulo function.

19. Apparatus according to claim 7, and wherein the management logic is implemented in one or more of the following: one or more Application-Specific Integrated Circuits (ASICs); one or more Field-Programmable Gate Arrays (FPGAs); a multi-core Networking Processing Unit (NPU); in software; and in hardware.

20. Apparatus according to claim 16, and wherein the management logic is implemented in one or more of the following: one or more Application-Specific Integrated Circuits (ASICs); one or more Field-Programmable Gate Arrays (FPGAs); a multi-core Networking Processing Unit (NPU); in software; and in hardware.

* * * * *